Figure 1:
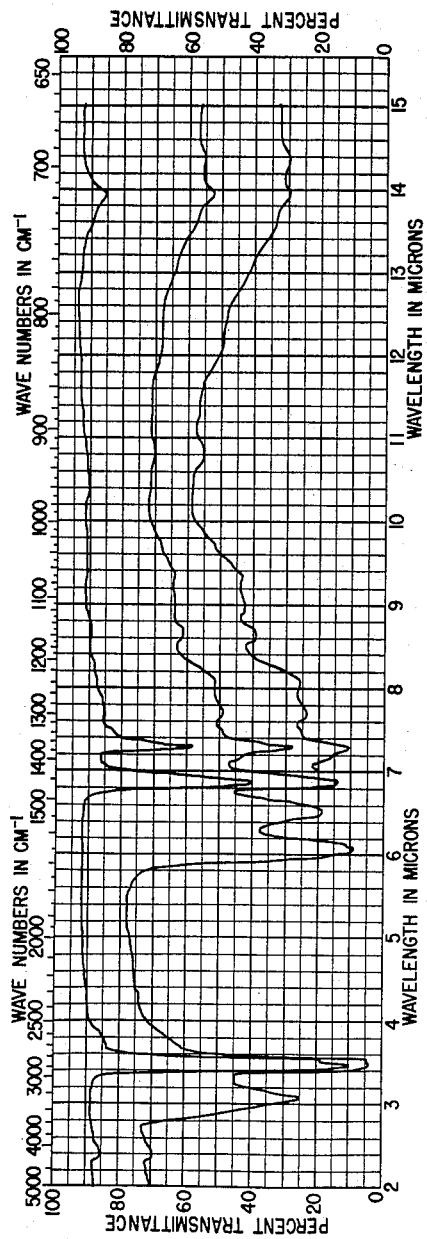

CHYMOTRYPSIN HYDROLYZED GROWTH HORMONE RECOVERY

United States Patent Office 3,118,815
Patented Jan. 21, 1964

3,118,815
GROWTH HORMONE AND RECOVERY THEREOF
Choh Hao Li, Berkeley, Calif., assignor to The Upjohn Company, Kalamazoo, Mich., a corporation of Delaware
Filed Sept. 28, 1959, Ser. No. 842,918
1 Claim. (Cl. 167—74)

The present invention relates to chymotrypsin hydrolyzed bovine growth hormone, to a novel method for its preparation, and to novel, injectable therapeutic compositions containing said active ingredient.

The novel compound of the present invention is an anabolic agent and is, therefore, useful for counteracting negative nitrogen balance generally associated with pituitary deficiencies and, more specifically, is useful in improving wound healing, increasing body weight and muscle strength, and in treating dwarfism.

The discovery that human growth hormone derived from the pituitary gland could be effective in the treatment of dwarfism has been noted (Science 124, 1293, 1956); however, the limited supply of human pituitaries has discouraged any wide-scale usage of this hormone. In view of the scarcity of human pituitaries the search for an effective growth hormone has shifted to non-primates and, more particularly, to bovine somatotropin or growth hormone. The bovine growth hormone has been isolated from the anterior lobes of bovine pituitaries (J. Biol. Chem. 159, 353, 1945) but this preparation has also proven ineffective as an anabolic agent in humans (J. Clin. Endocrinol. 10, 492, 1950). Subsequently, it was also found that different techniques could be employed in the isolation of the bovine growth hormone whereby the yield was increased tremendously (J. Biol. Chem. 211, 555, 1954). However, the activity of the product in humans was not improved.

It was ultimately concluded that the only obvious explanation for the ineffectiveness of bovine growth hormone in humans was primarily because the preparation was chemically different from human growth hormone (Federation Proc. 16, 775, 1957).

It was then suggested that perhaps a partially hydrolyzed bovine growth hormone might exhibit the desired activity. As in other polypeptide chemistry it was felt that perhaps the active component or core could be released by hydrolysis and separated from the undesirable contaminants. At the time pepsin and trypsin were utilized for hydrolysis of the bovine growth hormone (J. Biol. Chem. 159, 353, 1945), but it was soon determined that the product of these enzymes was relatively inactive. Also Condliffe and Li, Fed. Proceedings, 11, 198, 1952, utilized crystalline chymotrypsin to effect the hydrolysis and they reported that 50% of the activity in hypophysectomized rats was maintained. Subsequently, Li et al., J. Biol. Chem. 218, 41, 1956, also reported the hydrolysis of native bovine growth hormone utilizing crystalline chymotrypsin which product was administered to humans and found to produce positive nitrogen balance (Metabolism, 7, No. 6, 762, 1958).

The process disclosed by Li et al. involved digesting crystalline chymotrypsin and an aqueous solution of native bovine growth hormone in a borate buffer (pH 9.5) at a temperature of about 25° C. for a period of about four hours. The non-protein nitrogen was removed from the resulting mixture by treatment with 5% trichloroacetic acid in which the non-protein nitrogenous material was soluble. The growth-promoting substance was recovered by filtering the trichloroacetic acid mixture, dissolving the precipitate in a slightly alkaline solution, dialyzing the solution and subjecting the non-dialyzable material to lyophilization.

Figure 2:
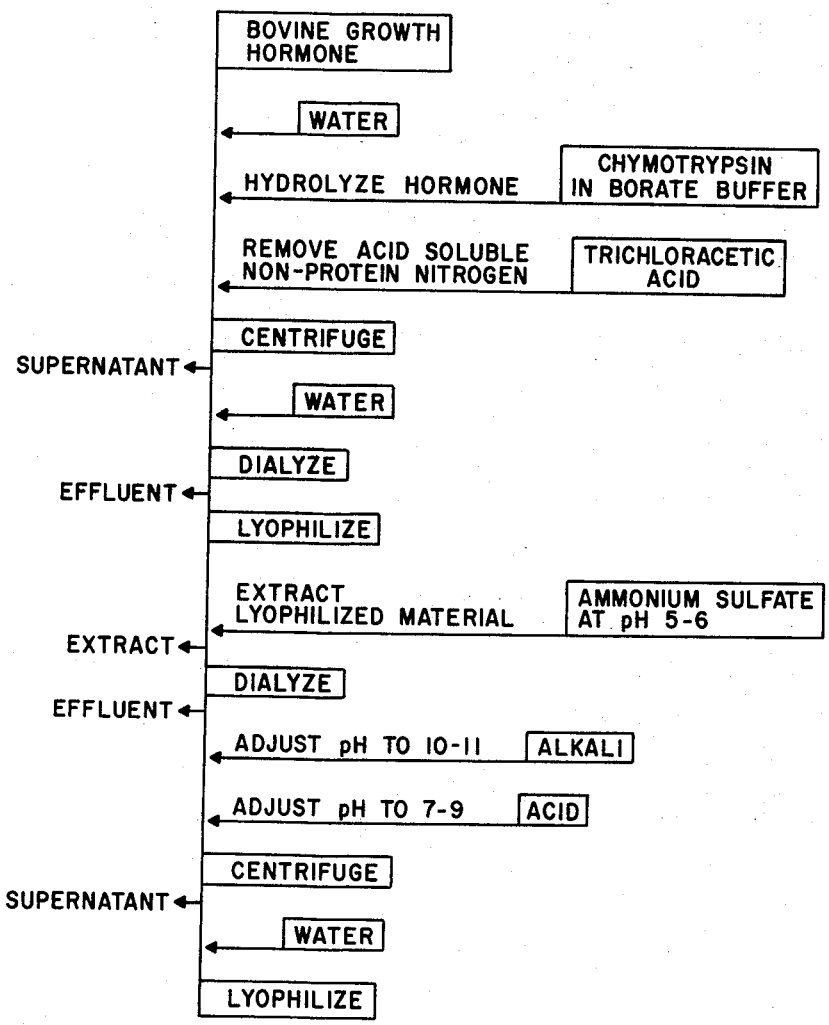

It has now been found, acording to the process of the present invention, that a more potent, and less anaphylactic product can be recovered by extracting the lyophilized material with ammonium sulfate at a pH of between about 5 and 6, suspending the insoluble material in water and dialyzing the mixture, adjusting the pH of the non-dialyzable mixture to between about 10 and 11 with an alkali such as, e.g., sodium hydroxide, potassium hydroxide, and the like, and then adjusting the pH of the mixture to between about 7 and 8 by the addition of an acid such as, e.g., hydrochloric acid, sulfuric acid, phosphoric acid, acetic acid, and the like, dissolving the resulting flocculent precipitate in water adjusted to a pH of between about 9 and 10, and subjecting the resulting mixture to lyophilization. The resulting preparation is characterized by a carbon content of about 52.6%, hydrogen content of about 7.6% and a sulfur content of about 2.2%. The overall process is set forth in the flow diagram, FIGURE 2.

The following example is illustrative of the process and product of the present invention, but is not to be construed as limiting.

*Chymotrypsin Hydrolyzed Bovine Growth Hormone*

The bovine growth hormone was isolated from the anterior lobes of beef pituitary glands by the Li process described in J. Biol. Chem. 211, 555, 1954.

Two gm. of the bovine growth hormone were dissolved in 100 ml. of water and this aqueous mixture was added to an equal volume of a solution of crystallized chymotrypsin (0.067 mg. of the enzyme per ml.) in a borate buffer of pH 9.5 and 0.1 ionic strength. The reaction was allowed to proceed for 105 minutes at 25° C. and was then stopped by the addition of an equal volume of cold 10% (weight/volume) trichloracetic acid. After being kept at 0° C. for 1–2 hours, the mixture was then centrifuged to remove the soluble fraction. The resulting precipitate was suspended in 100 ml. of water, and the suspension was thoroughly dialyzed against cold running water and lyophilized. The dried product weighed 1.5 gms. and was extracted twice at 0° C. with 100 ml. of a 0.45 M solution of ammonium sulfate of pH 5.1. The insoluble material was suspended in 100 ml. of water and thoroughly dialyzed against cold running water. The dialyzed suspension was adjusted to a pH of 10–11 by the addition of 1.0 M sodium hydroxide. The clear solution was next adjusted to a pH of 7.5 with 0.1 M hydrochloric acid, and the resulting flocculent precipitate was dissolved in 100 ml. of water by the addition of 1.0 M sodium hydroxide until the pH reached 10. The precipitation at pH 7.5 was again repeated. The final precipitate was dissolved in an aqueous solution of pH 10, frozen and dried in a vacuum. The lyophilized product weighed 0.9 gm.

The elemental analyses of the product showed the following determinations: C, 52.64%; H, 7.62%; S, 2.21%.

The infrared spectrum, FIGURE 1, exhibited characteristic absorption bands expressed in reciprocal centimeters at the following frequencies: 3250, 1648, 1530, 1390, 1300, 1240, 1160, 1115, 1070, 1027, 922, 697. The uppermost curve in FIGURE 1 represents the conventional Nujol blank while the two lower curves represent samples of chymotrypsin hydrolyzed bovine growth harmone samples in different concentrations.

The product was also subjected to electrophoresis in an acetate buffer of pH 4.0 and 0.03 ionic strength at 1° C. conducted in a Spinco electrophoresis-diffusion apparatus. The results indicated that the chymotrypsin hydrolyzed bovine growth harmone consisted of a main component (95% of the total) having a mobility of $8.72 \times 10^{-5}$ cm.$^2$ per volt per second.

A sedimentation analysis was performed in a Spinco Model E ultracentrifuge with a 1.0% solution of chymotrypsin hydrolyzed bovine growth harmone in 0.1 M of sodium carbonate and the active material sedimented as a broad peak with a sedimentation constant of 2.5 S.

Specific optical rotation of the chymotrypsin hydrolyzed product at a concentration of 10 mg./ml. and in a phosphate buffer of pH 2.3 and 0.05 ionic strength was −40° as determined in a Bellingham-Stanley polarimeter with a sodium light source at 23° C.

As indicated hereinbefore the compound of the present invention is useful as an anabolic agent for treatment of those physical disabilities generally associated with negative nitrogen balance. For this purpose sterile compositions for injectible use, i.e., intramuscular, subcutaneous or intravenous injections, can be prepared by mixing the active ingredients with a liquid pharmaceutically acceptable carrier.

The active compound can be administered by mixing with a sterile saline solution prior to usage or if a depot effect is desired the active product can be administered in conjunction with gelatin of the type described in U.S. Patent 2,669,537.

Oil suspensions can also be employed by mixing the active compound with a suitable fixed oil such as cottonseed oil, sesame oil, peanut oil, and the like, or mixtures of these. Dispersions in other nontoxic pharmaceutically acceptable liquid vehicles such as glycerol, sorbitol, propylene glycol, lower molecular weight polyethylene glycols, and the like, or combinations of these liquid vehicles, can also be utilized. Suitable preservatives, suspending agents and stabilizers can also be utilized.

The active compound can also be utilized in conjunction with exogenous corticoids such as methylprednisolone, prednisolone, prednisone, or hydrocortisone which generally create a negative nitrogen balance.

The dosage of the active compound of the present invention depends on the age, weight, and condition of the patient being treated. Generally, the preferred total daily dosage is 10 to 60 mg. given preferably in divided doses two to four times a day.

The following compositions are representative of the composition contemplated herein:

Example 1

1,000 ml. of a sterile parenteral preparation containing 15 mg. of chymotrypsin hydrolyzed bovine growth hormone per ml. is prepared from the following amounts and types of materials.

Per ml.:
  15 m. chymotrypsin hydrolyzed bovine growth hormone _____ gms__ 15
  Sterile normal saline (0.9% sodium chloride), q.s. to 1000 ml.

The powdered chymotrypsin hydrolyzed bovine growth hormone is previously sterilized by treatment with ethylene oxide and then added aseptically to the sterile normal saline and packaged aseptically in sterile containers with 1 ml. of the finished product. This is used intramuscularly or subcutaneously in doses of 1 ml. 4 times a day in order to alleviate negative nitrogen balance. The same preparation is used intravenously in doses of 2 to 5 ml. once a day.

For increased stability, the sterile dry drug is also packaged in a separate sterile vial to which the sterile normal saline is added just prior to use.

Example 2

1,000 ml. of a sterile intramuscular preparation containing 10 mg. of chymotrypsin hydrolyzed bovine growth hormone per ml. is prepared from the following types and amounts of materials.

Per ml.: Gms.
  10 mg. sterile chymotrypsin hydrolyzed bovine growth hormone, powder _____ 10
  5 mg. phenol _____ 5
  Sterile aqueous gelatin, 16% conc., partially hydrolyzed, non-antigenic, q.s. to 1000 ml.

The phenol and chymotrypsin hydrolyzed bovine growth hormone are dispersed aseptically in the sterilized gelatin solution and then packaged in sterile containers with 1 ml. of the final product. This is used in doses of 1 ml. 4 times a day to improve wound healing in patients with a negative nitrogen balance.

For increased stability, the sterile dry drug and sterile gelatin diluent are packaged in separate sterile vials and the two vials are mixed prior to use.

Example 3

1,000 ml. of a sterile intramuscular preparation containing 2.5 mg. of chymotrypsin hydrolyzed bovine growth hormone and 2.5 mg. of methylprednisolone is prepared from the following types and amounts of materials:

Per ml.: Gms.
  (1) 2.5 mg. chymotrypsin hydrolyzed bovine growth hormone, powder _____ 2.5
  (2) 2.5 mg. methylprednisolone, micronized___ 2.5
  (3) 30 mg. polyethylene glycol, 40,000 U.S.P__ 30
  (4) 9 mg. sodium chloride _____ 9
  (5) 2 mg. polysorbate 80, U.S.P_____ 2
  (6) 1.8 mg. methylparaben, U.S.P_____ 1.8
  (7) 0.2 mg. propylparaben, U.S.P_____ 0.2
  Water for injection, q.s. to 1000 ml.

The parabens are added to most of the water and dissolved with stirring and heating to 65–70° C. The mixture is cooled to room temperature and ingredients 3, 4, and 5 are added. The resulting solution was made up to 1,000 ml. with water and sterilized by filtration. Ingredients 1 and 2 are sterilized with ethylene oxide and added aseptically. The final preparation is packaged in sterile containers with 1 ml. of the final product. This is used advantageously in the treatment of arthritis and to avoid negative nitrogen balance.

For increased stability, the sterile, dry chymotrypsin hydrolyzed bovine growth hormone is also packaged in a separate sterile vial and the rest of the ingredients in a second vial. The two are mixed prior to use.

In the above formulation the 2.5 gms. of methylprednisolone can be increased to 10 or 15 gms. Also, the methylprednisolone can be substituted by 5 gms. prednisolone, 10 gms. prednisone or 25 gms. of hydrocortisone.

I claim:

In a process for the preparation of chymotrypsin hydrolyzed bovine growth hormone wherein native bovine growth hormone is digested with crystalline chymotrypsin, the acid-soluble non-protein nitrogen is removed by trichloracetic acid, the acid insoluble matter is subjected to dialysis and the non-dialyzable material is lyophilized, the improvement which comprises the steps of extracting the lyophilized material with ammonium sulfate at a pH between about 5 and 6, dialyzing the remaining mixture, adding sufficient alkali to the non-dialyzable material to adjust the pH to between about 10 and 11, adding sufficient acid to the alkaline mixture to lower the pH to between about 7 and 8, filtering to remove the flocculent precipitate, dissolving the precipitate in water, and lyophilizing the mixture.

References Cited in the file of this patent

UNITED STATES PATENTS 2,739,099    Walaszek _____ Mar. 20, 1956

OTHER REFERENCES

Condliffe et al.: Federation Proceedings, vol. 11, March 1952, page 198.

Li et al.: Nature, No. 4484, pp. 687–689, Oct. 8, 1955.

Li et al.: J. Biol. Chem., vol. 218, pp. 41–52, January 1956.

Drug Trade News, March 24, 1958, page 36, Manf. Sec.